R. E. HELLMUND.
CONTROL SYSTEM.
APPLICATION FILED SEPT. 25, 1914.

1,249,954.

Patented Dec. 11, 1917.
3 SHEETS—SHEET 1.

WITNESSES:
R. J. Edge.
W. R. Coley.

INVENTOR
Rudolf E. Hellmund.
BY
Wesley G. Carr
ATTORNEY

R. E. HELLMUND.
CONTROL SYSTEM.
APPLICATION FILED SEPT. 25, 1914.

1,249,954.

Patented Dec. 11, 1917.
3 SHEETS—SHEET 2.

INVENTOR
Rudolf E. Hellmund
BY
Wesley G. Carr
ATTORNEY

WITNESSES:

R. E. HELLMUND.
CONTROL SYSTEM.
APPLICATION FILED SEPT. 25, 1914.

1,249,954.

Patented Dec. 11, 1917.
3 SHEETS—SHEET 3.

WITNESSES:

INVENTOR
Rudolf E. Hellmund
BY
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,249,954.     Specification of Letters Patent.     Patented Dec. 11, 1917.

Application filed September 25, 1914. Serial No. 863,504.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Control Systems, of which the following is a specification.

My invention relates to systems of control, and it has special reference to means for preventing the occurrence of "flash-over" conditions in dynamo-electric machines, more particularly electric railway motors, under predetermined conditions.

The object of my invention is to provide simple and reliable means of the above-indicated character which shall effectively obviate the possibility of "flash-over" of electric motors upon the resumption of supply-circuit voltage after a temporary interruption thereof, such as is caused by the trolley wheel or other current-collecting member passing under a section break or otherwise momentarily leaving the supply-circuit conductor.

More particularly, in high-voltage direct current systems and in the case of locomotives of large capacity, it may be advisable, for economical and other reasons, to provide means for preventing "flash-over" of the motor, the most common cause of which is the sudden resumption of supply-circuit energy after the temporary interruption thereof at section breaks, etc. Whenever the supply of energy is resumed, a heavy rush of current through the deenergized motor windings occurs, which causes great field-flux distortion and relatively high voltage between commutator segments. This condition arises by reason of the fact that the flux set up by the armature current, upon resumption of supply-circuit energy, readily traverses the entirely laminated armature core, and, consequently, builds up to a normal value much more rapidly than the main field flux which encounters the high magnetic reluctance of the solid iron or steel frame castings and which is, therefore, partly damped out by eddy currents.

According to my present invention, I provide various modifications of means for obviating the above-mentioned operating difficulties by energizing a part or all of the main field windings from some auxiliary source of energy when the supply-circuit energy is temporarily interrupted. The main field flux is thus maintained at a predetermined value during the interruption and, as a result, when the supply-circuit energy is resumed, the predominance of armature ampere-turns over field ampere-turns is prevented, and "flash-over" conditions do not obtain. In one form, my invention comprises the use of a small auxiliary motor-generator or dynamotor, driven from the supply circuit, for energizing a predetermined part of the field winding. In this case, the motor end of the auxiliary machine is also deënergized upon an interruption of the connection to the supply circuit; however, if the machine is provided with a fly-wheel or inherently has considerable fly-wheel effect, the energization of the main field winding from the generator end of the machine will be maintained for a predetermined period. Longer energy interruptions may be provided for by means of suitable automatic devices for switching in an independent source of energy to supply current to the main field winding at the end of the said period.

Moreover, systems of the class mentioned have an additional advantage of flexibility of operation, in that the field current and, consequently, the armature voltage may be increased to cause the current in the motor circuit to assume a relatively low value, substantially zero if desired, before the motor circuit switches connected to the supply circuit are opened, either manually or automatically. Injurious arcing in the switches may thus be entirely avoided.

In the accompanying drawings, Figures 1 to 11, inclusive, are diagrammatic main circuit views of the control systems embodying various forms of my invention; Fig. 12 is a diagrammatic view of an auxiliary control system for governing the main-circuit system of Fig. 11 in accordance with the sequence chart, of well-known form, shown in Fig. 13.

Figures 1, 2, 3:
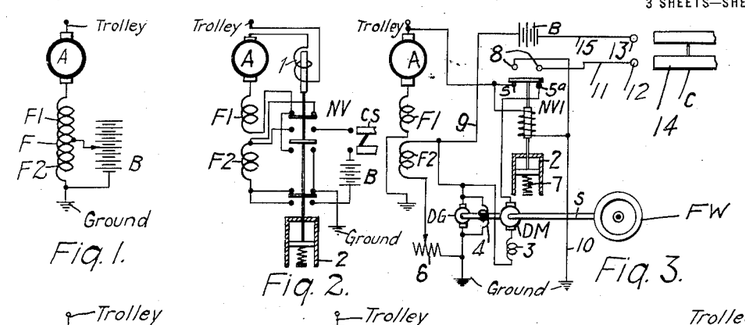

Referring to Fig. 1 of the drawing, the system shown comprises a supply-circuit conductor marked "Trolley", a return circuit conductor marked "Ground", an electric motor having an armature A and a field magnet winding F which may be divided into a plurality of parts $F^1$ and $F^2$, and an auxiliary source of energy, such as a battery B, that is variably connected to the part $F^2$ of the field winding.

Any familiar and suitable form of "no-voltage release" switch, with a graduated return to prevent disconnection of the auxiliary source of energy before the field is properly built up, may be employed. The switch may take a form similar to that illustrated in Fig. 2 and described below. Whereas, for the sake of simplicity and clearness, the switch in question is not illustrated in the other systems shown, it will be understood that it is preferably employed in the various systems.

The system illustrated in Fig. 2 comprises, in addition to the apparatus shown in Fig. 1, a no-voltage release switch NV, and a portion of a motor-controlling switch CS, the complete connections of which are omitted, for the sake of simplicity. When the series-connected actuating coil 1 of the switch NV is energized from the supply circuit, the switch assumes its upper position shown in the drawing, in opposition to the momentary action of the dash-post 2 or other suitable retarding means. The armature and the two portions of the field winding are then connected in series-circuit relation. Upon the failure of the supply circuit voltage, the switch drops to its lower position, thereupon disconnecting the part $F^2$ of the field winding from the motor circuit and connecting it to the battery B, provided the controlling-switch CS occupies any "on" position; such field connections, of course, not being desired when the motor is voluntarily disconnected from the supply circuit.

Assuming that, upon a temporary interruption of supply-circuit voltage, the parts of the systems shown occupy their respective emergency positions, the operation thereof, which, it will be understood will apply, in a general sense, to the various other systems to be hereinafter described, may be set forth as follows: the temporary battery connection maintains the field flux at any desired value during the interruption. When the supply-circuit energy is resumed, the field ampere-turns will thus immediately be of a normal or other predetermined value, irrespective of the slow building up of the field flux by the motor current. The predominance of armature ampere-turns over field ampere-turns is prevented in this way, and flash-over conditions do not obtain.

The system illustrated in Fig. 3 comprises a supply circuit and an electric motor similar to those shown in Figs. 1 and 2; a small motor-generator or, preferably, a dynamotor of familiar form which is customarily employed for control and lighting purposes in many types of locomotives; a battery B; a portion of a controlling-switch C; and a no-voltage graduated release switch $NV^1$.

The dynamotor preferably comprises a motor armature winding DM, and a generator armature winding DG that are mounted on a common shaft S, a series-connected field magnet winding 3 and a second field magnet winding 4 that is connected in parallel with the generator armature. The machine is either designed to have relatively great flywheel effect or is provided with a suitable flywheel FW. Energy is supplied to the dynamotor from the supply circuit through coöperating stationary and movable contact members 5 and $5^a$ of the switch $NV^1$ when in its lower position or energized condition; and the generator armature winding DG is connected through a suitable variable resistor 6 across the portion $F^2$ of the main field magnet winding.

The controlling-switch C may take any usual form, and, for the sake of clearness and simplicity, only the portion thereof that I employ in effecting the preventive action under consideration is illustrated. The no-voltage release switch $NV^1$ may be of any suitable form, such as that illustrated in Fig. 2, with the addition of means, such as a spring 7, for biasing the switch to its upper position, for example, for a purpose to be described.

Assuming that, just prior to an interruption of supply-circuit energy, the various parts of the system occupy their respective illustrated positions, the operation of the system may be briefly described as follows: The fly-wheel effect of the dynamotor will maintain a suitable rotative speed thereof, and, consequently, energization of the portion $F^2$ of the main field winding for a predetermined period of time, which will usually extend until supply-circuit energy is resumed. However, if the energy is interrupted for a longer period, then the deënergized no-voltage graduated release switch, actuated by the biasing spring 7, reaches its upper position, wherein the movable contact member $5^a$ makes contact with a pair of stationary contact members 8. A circuit is thereby established from one side of the battery B, through conductor 9, the portion $F^2$ of the main field winding, the resistor 6 to "ground," and from "ground," through conductor 10, stationary and movable contact members 8 and $5^a$ of the switch $NV^1$, conductor 11, control fingers 12 and 13—which are bridged by a contact segment 14 of the controlling switch C in any operative position—and conductor 15 to the other side of the battery B. The field winding F² may thus be continually energized until supply-circuit energy is resumed to energize the switch NV¹ and return it to its lower position, or until the controlling switch C is voluntarily returned to the "off" position.

It may be observed at this time that the systems hereinbefore described, as well as several of the systems to be set forth, are readily adapted for use in the well-known "field control" systems. The excitation of the field winding F² may be easily regulated by the variation of the number of active cells of the systems shown in Fig. 1 and in Fig. 2, and of the resistor 6 in Fig. 3. Moreover, a separately excited portion of the main field winding may be of advantage in limiting the maximum speed of the motor-driven vehicle to any desired value.

Figure 4:
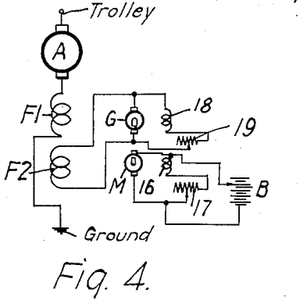

The system illustrated in Fig. 4 comprises a supply circuit and a main motor similar to those shown in Fig. 3, a battery B, and a motor-generator set driven from the battery and connected to energize the portion F² of the main field winding during temporary interruptions of the supply-circuit energy. The motor-generator set comprises a driving motor M having a shunt field winding 16 that may be regulated by a suitable resistor 17, and a generator G having a shunt field winding 18 that may be varied by a resistor 19. In this case, field control of the main motor may be readily effected by variation of the field resistors 17 and 19, or of the battery B. It will be understood that, whenever a dynamotor is available, the generator G may be coupled directly thereto, and the motor M and battery B may be omitted. Where a battery is used, it may again be charged from the main motor circuit, as in Fig. 1, for example, if desired. In another aspect, the exciting generator G may be driven by a gas engine or other prime mover.

Figure 5:
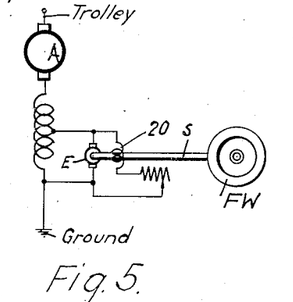

In Fig. 5, a small dynamotor-electric machine E is connected across a predetermined part of the main motor field winding, and is provided with a variable shunt field winding 20 and a fly-wheel FW. While the main motor is operating normally, the machine E will be driven from the field-winding voltage as a motor. Upon interruption of the supply-circuit energy, the fly-wheel effect of the machine E will keep it running as a generator to excite the main winding for a predetermined period of time. If desired, an automatic arrangement for maintaining a longer energization of the main field winding, whenever necessary, such as that illustrated in Fig. 3, may be employed.

Figure 6:
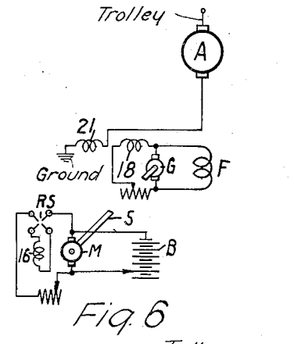

The system shown in Fig. 6 comprises a suitable supply circuit; a main propelling motor having an armature A and a single-part main field winding F; and a motor-generator set having a motor M that is driven from a variable battery B and is provided with a variable shunt field winding 16 which may be reversed by a suitable reversing switch RS, and a generator G that is provided with a variable shunt field winding 18 and a series field winding 21 which is connected in circuit with the main armature A, and that is connected, as a whole, to energize the main field winding F.

Although no part of the field winding F is connected in circuit with the main motor armature A during emergency conditions, the series characteristic of the main motor is, nevertheless, maintained to a very large extent by the use of the series-connected field winding of the generator G. The shunt field winding 18 is merely strong enough to maintain a predetermined energization of the main field winding F upon a temporary interruption of supply circuit energy, and is also adapted to permit of ready means for "field control," if desired.

Figures 7, 8, 9, 10:
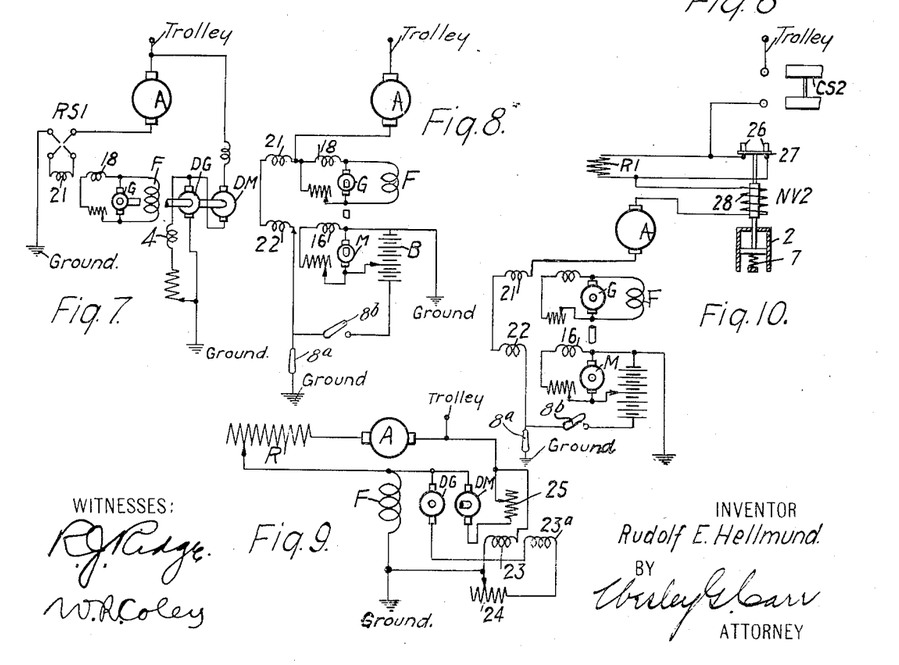

However, the generator field winding 18 may be omitted in many cases, because, with very short interruptions of energy, the self-induction of the main field winding F will prevent the field current from dying out rapidly. Longer interruption of supply-circuit voltage may be compensated for by means of a suitable automatic switching device, such as is illustrated in Fig. 3. In case the shunt field winding 18 is omitted, a very desirable series characteristic may be obtained for the main motors, and "field control" may be conveniently effected through changes in the speed of the motor M by variation of its shunt field-winding current or of the battery voltage. Wherever a dynamotor is available, the generator G may be mechanically connected thereto, as illustrated in Fig. 7, and the speed of the dynamotor may be varied by manipulating its shunt field winding 4. It should be noted that the latter case is relatively simple in that the method of "field control" permits of the omission of a number of the main-circuit switches that are employed in many systems of the prior art. Moreover, the customarily employed main-circuit reversing switch may be omitted, by the utilization of the small motor-field reversing switch RS, as in Fig. 6, to reverse the direction of rotation of the motor-generator set, thereby obviating the necessity of switching heavy currents. In these ways, the cost of the systems just described will probably not be as great as those of the usual types. However, where a dynamotor is employed as motive power for the small generator, as in Fig. 7, it is not desirable to reverse the direction of rotation. In such a case, the reversing switch for the main motor may be kept small by designing the main motor field F for fairly high voltage and, therefore, for small current. A reversing switch RS¹ for compensating reversals in main-circuit current through the generator field winding 21 is also preferably employed.

It will also be understood that, in the case of interpole motors, the interpole field windings may be treated similarly to the main field windings in the system of Fig. 6 and in several of the other systems, if desired.

In Fig. 8 is shown a system quite similar to that illustrated in Fig. 6, the chief differences residing in the provision of a coöperating series field winding 22 for the motor M. In several of the above-described systems, the main field winding F would be only partially energized upon interruption of the supply-circuit energy. In the system under consideration, the field windings of the auxiliary motor M are designed so that, even with a relatively small load on the main motor, the motor M has a highly saturated field, and, therefore, the speed of the motor-generator set will change very little with the main motor load. Thus, under normal operating conditions, the series field winding 22 of the auxiliary motor has relatively small influence upon the characteristic curves of the main motor. However, if the main current is interrupted, a relatively weak field flux is supplied by the shunt field winding 16 alone, thereby increasing the speed of the motor-generator set and, consequently, increasing the energizing current of the main field winding F to any desired extent. When supply-circuit energy is resumed, the main motor has a relatively strong field flux already established. The system just described will compensate for either temporary or relatively long supply-circuit energy interruptions. In case of short interruptions, the field strength of the main motor is maintained through the agency of the self-induction of the field windings F and 18; while, in case of longer interruptions, the main field strength is maintained as just recited. If desired, the battery B may, in this system, as in several others shown, be charged from the main circuit, by opening a switch 8$^a$ and closing a switch 8$^b$, or the generator field winding 18 may be excited from the battery B, if desired.

The system illustrated in Fig. 9 comprises a suitable supply circuit, the main motor having the armature A and the field winding F, a main circuit variable resistor R, and a dynamotor having a motor armature winding DM, a generator armature winding DG, a shunt-connected field winding 23, and a field winding 23$^a$ that is connected in series with the generator armature DG and a variable resistor 24 across the main field winding F. The dynamotor may be connected in series with a variable resistor 25. The dynamotor field windings 23 and 23$^a$ are disposed to act differentially under emergency conditions.

The operation of the system under consideration may be briefly set forth as follows: When the main motor is being accelerated by varying the resistor R, in accordance with customary practice, a portion of the main current traverses the generator armature winding DG and the associated field winding 23$^a$, the field windings 23 and 23$^a$ thus being adapted to aid each other to produce a relatively strong field flux in the dynamotor, thereby causing it to run at a relatively slow speed. In case of interruption of the supply-circuit energy, however, the generator armature DG will supply current to the main field winding F in the same direction as before, thus effecting a reversal of the current in the armature DG and in the field winding 23$^a$.

The ensuing differential action between the dynamotor field windings produces a relatively weak field flux in the machine, with a corresponding increase of speed to effect a predetermined energization of the main field winding F. When supply-circuit energy is resumed, the current through the generator will reverse again, and, since the dynamotor is running at a relatively high speed, the voltage across the field winding F at the time will be sufficiently high to effect a rapid building up of the main field flux to its normal value.

Fig. 10 discloses another modification, wherein the series field winding 22 of the auxiliary motor M is adapted to act differentially with respect to the shunt field winding 16. The generator G, as shown, has the series field winding 21. The main armature A is connected to the supply circuit through a portion of a control switch CS$^2$ and a resistor R$^1$, which is paralleled by the coöperating stationary and movable contact members 26 and 27, respectively, of a no-voltage graduated release switch NV$^2$. The series-connected actuating coil 28 of the switch, when energized through the control switch CS$^2$, is adapted to maintain contact between the contact members 26 and 27, which contact is not broken until a spring member 7 within the dash-pot 2 separates these contact members a predetermined period of time after the interruption of supply-circuit energy.

The system just described, while not suitable for maintaining the main field energization, as set forth in connection with the system shown in Fig. 8, during relatively long energy interruptions, will however, produce a relatively steep main-motor speed characteristic, which is usually very desirable. This steep characteristic is obtained by reason of the fact that, whenever the armature current increases, the field-winding voltage and, therefore, the field current is increased, because of the increased excitation of the generator series field winding 21, as well as the increased speed of the motor-generator set that is caused by the field-weakening action of the differentially-connected motor field windings 22 and 16.

The function of the resistor $R^1$ and switch $NV^2$ is to act as a protective device in case of relatively long energy interruptions. Upon the deënergization of the actuating coil 28 of the switch, the spring 7 gradually raises the movable contact member 27, until the contact members 26 and 27 separate after a predetermined period of time. If supply circuit energy is then resumed, the interposition of the resistor $R^1$ in circuit will prevent an excessive instantaneous flow of current, if the control switch $CS^2$ still occupies an operative position. The switch $NV^2$ will then be closed by the energization of its actuating coil 28. As in Fig. 8, the battery may be charged from the main motor circuit, if desired, by opening the switch $8^a$ and closing the switch $8^b$.

It should be understood that various modifications of the systems hereinbefore illustrated may be readily effected; for example, the generator series field winding 21 or the shunt field winding 18 may be omitted in some cases, without materially varying the operation of the particular system.

Figures 11, 12, 13:
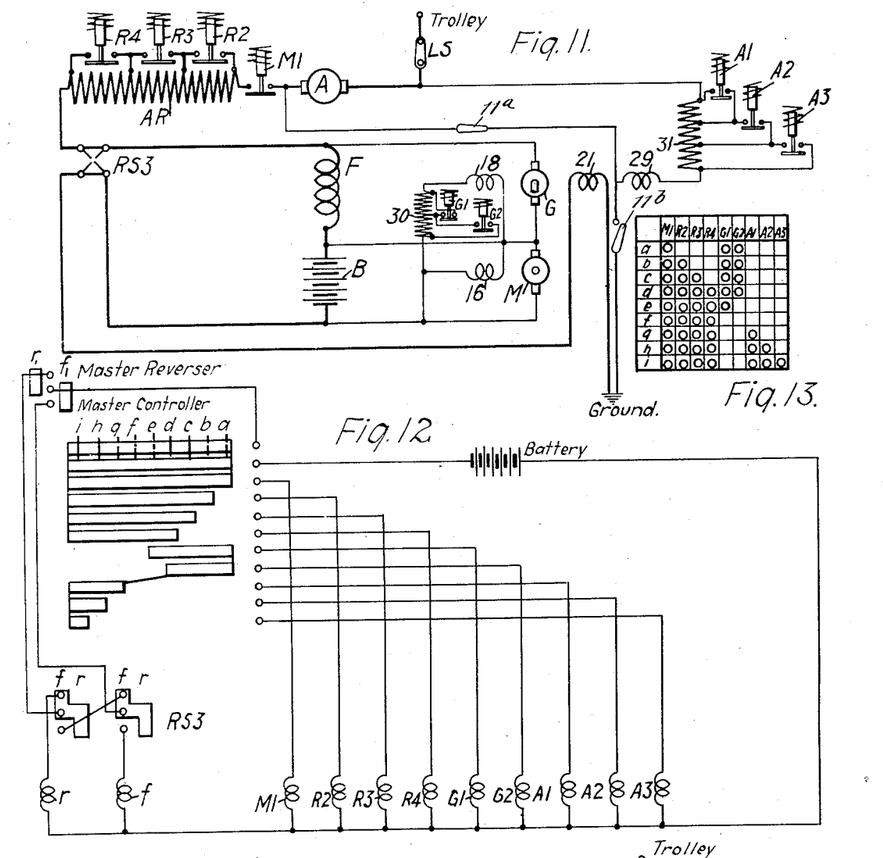

Fig. 11 illustrates a system comprising a suitable supply circuit, the main motor having the armature A and the field winding F; the battery B which is connected in circuit with the motor; the auxiliary motor-generator set having a motor M that is driven from the battery B and a generator G that is adapted to energize the main field winding F; a reversing switch $RS^3$ for the armature A with respect to the field winding F and the motor-generator set and battery; an accelerating resistor AR, the sections of which are adapted to be respectively short-circuited by switches $R^2$, $R^3$ and $R^4$; and a plurality of main circuit switches LS and $M^1$.

The motor M is provided with a shunt field winding 16, while the generator G is provided with three field windings 18, 21 and 29. The shunt field winding 18 is connected in series with a resistor 30, the sections of which are respectively adapted to be short-circuited by switches $G^1$ and $G^2$; the series field winding 21 is connected in series-circuit relation with the main motor; and the field winding 29 is adapted to act differentially to the other two and is connected across the main armature A in series with a resistor 31, the sections of which are respectively adapted to be short-circuited by switches $A^1$, $A^2$ and $A^3$. All of the switches shown, with the exception of the switch LS, are preferably of a simple and familiar electromagnetically operated type, the actuating coils of which are adapted to be energized by the auxiliary control system shown in Fig. 12, in accordance with the sequence chart of Fig. 13.

The acceleration of the motor may be effected by initially closing switches LS, $M^1$, $G^1$ and $G^2$, then gradually and successively closing the resistor-short-circuiting switches $R^2$, $R^3$ and $R^4$; further acceleration may be secured by successively opening switches $G^1$ and $G^2$ to weaken the shunt field winding 18, and closing switches $A^1$, $A^2$ and $A^3$ to strengthen the armature-excited, differentially-connected field winding 29, thereby in each case serving to further weaken the current in the main field winding F to increase the main motor speed. The auxiliary control system illustrated in Fig. 12 is of a simple and familiar type that is adapted to actuate the several circuit switches as just described and, as indicated in the chart of Fig. 13, and, inasmuch as the particular system employed for arranging the circuit connections of the system shown in Fig. 12 is not material to my present invention, I have not deemed it necessary to describe the auxiliary control system in detail.

Assuming the motor to be running in its final operating condition, and that the actions of the generator field windings 18 and 29 are then exactly equal and opposite, so that the field winding 21 is alone active, the operation of the system with respect to the prevention of "flash-over" conditions may be described as follows: By reason of the neutralization of the generator field windings 18 and 29, the main motor will run with a straight series speed characteristic. Upon the interruption of supply-circuit energy, the main motor field excitation and the main armature voltage tend to decrease to zero. Consequently, the excitation of the armature-excited field winding 29 decreases, with the result that the shunt field winding 18 exerts an active influence to produce a positive magnetization of the generator G, and, therefore, of the main field winding F to a predetermined extent which will obviate an excessive rush of current when the supply-circuit energy is resumed.

The system shown has the further advantage of producing relatively steep speed characteristic curves, during acceleration. Since the generator field winding 29 is excited from the main armature A, the voltage impressed upon the field winding will increase as the main-circuit resistor is gradually short-circuited, thereby effecting an automatic decrease of the current supplied by the generator G to the main field winding F as the main motor accelerates, by reason of the differential action of the field winding 29. It will be understood that relatively steep accelerating characteristic curves signify a relatively small number of requisite accelerating positions of a motor-controller. As a modification of the system, the generator field winding 29 may be connected across the supply circuit, by opening a switch 11$^a$ and closing a switch 11$^b$, in which case, the type of characteristic curves referred to would not, of course, be obtained.

Figure 14:
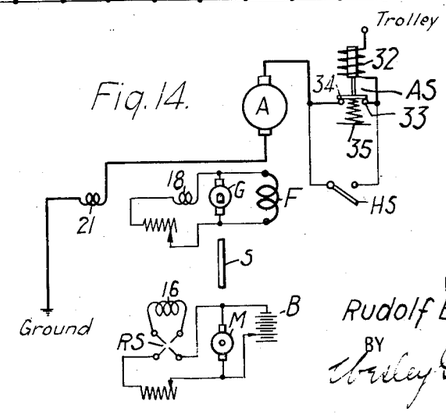
Fig. 14 is a diagrammatic view of a modification of my invention.

A further advantage of the various systems described herein, in which the main motor field winding is either partially or entirely excited from a separate source of energy, resides in their adaptability to provide means for interrupting the main motor circuit during motor operation when a substantially zero current obtains, and, consequently, without arcing. For example, consider the system shown in Fig. 14, which comprises the system shown in Fig. 6, with the addition of an automatic switch AS and a parallel-connected hand-operated switch HS. When it is desired to disconnect the main motor from the supply circuit, the auxiliary motor field winding 16 may be weakened to effect an increased speed of the motor-generator set, or the generator winding 18 may be strengthened, or both, to increase the energization of the main field winding F, thereby increasing the main armature voltage to a value that is substantially equal to the voltage impressed upon the armature A from the supply circuit. In this manner, the motor current is reduced to practically a zero value, whereupon the circuit may be broken either manually or automatically in any suitable manner. Arcing and its ensuing deleterious results may thus be obviated. For instance, the automatic switch AS, which comprises an actuating coil 32 and coöperating stationary and movable contact members 33 and 34, respectively, that are all included in the main motor circuit, and a spring member 35 for biasing the switch to the open position, may be employed. The hand-operated switch HS is connected in parallel relation with the contact members of the switch AS. For connecting the main motor to the supply circuit, the switch HS is initially closed, thereby effecting the energization of the actuating coil 32 of the switch AS, which then closes and connects its coöperating contact members 33 and 34 in circuit with the main motor and the coil 32. For disconnecting the main motor from the supply circuit, the switch HS is opened, and the motor current is reduced to zero, as described above. The switch AS maintains its closed position until the current absorbed from the supply circuit assumes the low value referred to, when the switch automatically interrupts the motor circuit. The opening of the automatic switch AS upon a temporary interruption of supply-circuit energy will not prevent the operation of the system relative to the obviation of "flash-over" conditions, inasmuch as the switch HS is closed at the time.

Figure 15:
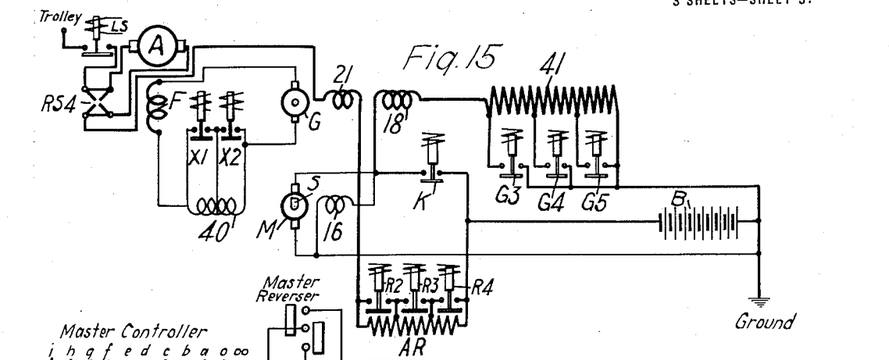
Figs. 15, 16, and 17 are views, respectively similar to Figs. 11, 12 and 13, of another modification of my invention.

The system shown in Fig. 15 comprises a suitable supply circuit, the main motor having the armature A and field winding F; an auxiliary motor-generator set comprising a motor M that is driven from a battery B in the main circuit, and a generator G that is connected to energize the main field winding F; an accelerating resistor AR, the sections of which are respectively adapted to be short-circuited by switches R$^2$, R$^3$ and R$^4$, which are preferably of a familiar electromagnetically actuated type; a line switch LS and an auxiliary motor-circuit switch K of similar form; and a reversing switch RS$^4$ for reversing the electrical relations of the main armature and field winding.

The auxiliary motor M is provided with a shunt field winding 16, and a second field winding 40 that is connected in series-circuit relation with the main field winding F, and the sections of which are respectively adapted to be short-circuited by switches X$^1$ and X$^2$. The generator G is provided with a shunt field winding 18 that is connected in series with a resistor 41, the sections of which are respectively adapted to be short-circuited by switches G$^3$, G$^4$ and G$^5$, across the battery B, and with a series field winding 21 that is connected in series-circuit relation with the main motor.

Figure 16:
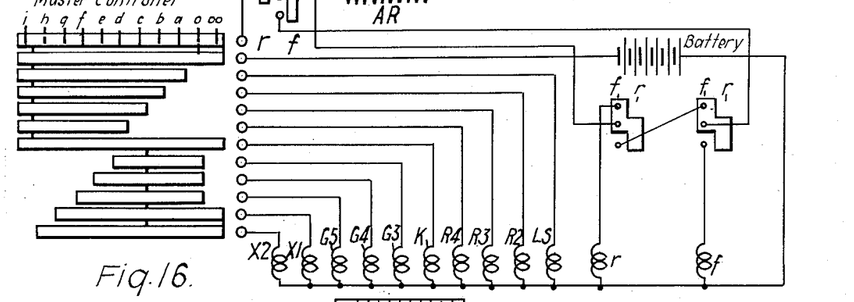
Figure 17:
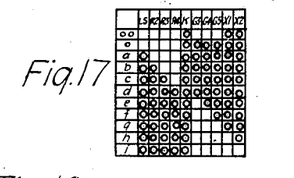

The auxiliary control system, of a familiar type, that is illustrated in Fig. 16, is adapted to actuate the various switches embodied in the system shown in Fig. 15 in accordance with the sequence chart of Fig. 17. Inasmuch as the particular means for manipulating the main-circuit connections is not relevant to my invention, no detailed description thereof is deemed necessary.

The accelerating operation of the system shown in Fig. 15 may be briefly set forth as follows: Upon initial connection to the supply circuit, the switches LS and K are closed, and the motor field winding 40 and the generator field resistor 41 are completely short-circuited. The sections of the accelerating resistor are then successively short-circuited by the closure of the switches R$^2$, R$^3$ and R$^4$, to gradually effect an increased main motor speed. The several field-controlling switches G$^3$, G$^4$ and G$^5$, and X$^1$ and X$^2$ are opened in that order to respectively effect a weakening of the generator-field flux and a strengthening of the auxiliary motor-field flux with its consequent motor-speed reduction, to thereby gradually decrease the excitation of the main field winding F, and thus increase the main motor speed. Inasmuch as the auxiliary motor field winding 40 is connected in series-circuit relation with the main field winding F, the direction of current traversing which is the same for a given direction of rotation, the auxiliary motor field winding 40 will never have a negative effect upon the field flux of the small motor M.

In case of an interruption of supply-circuit energy, the generator voltage will decrease by reason of the deënergization of its series field winding 21, thus effecting a certain decrease in the excitation of the main field winding F; however, this condition will be counterbalanced to some extent because the reduced current in the auxiliary motor field winding 40 will tend to increase the speed of the motor-generator set, and thus again increase the main motor field excitation, and maintain a predetermined value thereof during the energy interruption.

Figure 18:
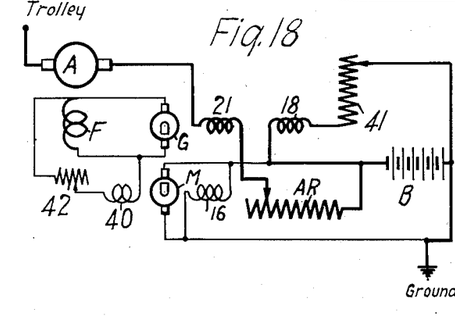
Figs. 18 and 19 are diagrammatic views of further modifications thereof. Like reference characters designate like parts in all of the figures.

Fig. 18 illustrates, by a simplified diagram, a system which differs from that shown in Fig. 15 only in that the field winding 40 of the auxiliary motor is connected in series with a variable resistor 42 across the main field winding F, instead of in series therewith, as in the system of Fig. 15. The operation of the system will be readily understood from the discussion given in accordance with Fig. 15.

If desired, instead of exciting the generator shunt field winding 18 from the battery B, it may be energized from the main armature A. While the speed characteristic of the main motor will then be somewhat different, the operation of the system relative to temporary supply-circuit interruptions will be similar to that just set forth.

Wherever it is necessary or desirable to compensate for relatively long power interruptions, a protective system similar to that shown in Fig. 10 may be employed to automatically insert the resistor AR in circuit a predetermined length of time after the interruption of supply-circuit energy.

Figure 19:
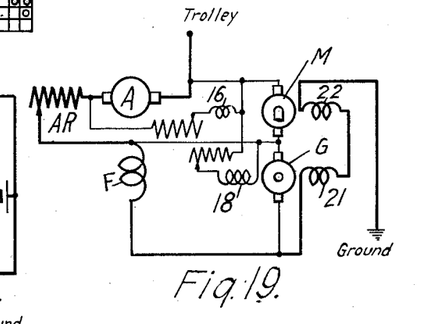

Fig. 19 discloses a system comprising a suitable supply circuit including conductors respectively marked "Trolley and Ground;" the main motor having the armature A and the field magnet winding F; an accelerating resistor AR; and an auxiliary motor-generator set comprising a motor M, and a generator G that is adapted to energize the main field winding F. The purpose of this system is to effect the desired results under emergency conditions, without requiring the use of a battery or other auxiliary source of energy for the small motor, the armature thereof being connected across the main armature A and the accelerating resistor AR.

The motor M is also provided with a shunt field winding 16 which is adapted to be variably energized from the main armature A, and with a second field winding 22 that is connected in the main motor circuits. The generator G has a variable shunt field winding 18 that is connected across the terminals of the armature of the small motor M, and a second field winding that is disposed in the main motor circuit.

The prevention of "flash-over" conditions in the system just described, upon the resumption of supply-circuit energy after a temporary interruption thereof, is effected as follows: The deënergization of the generator field winding 21 tends to decrease the excitation of the main field winding F, and, consequently, to decrease the voltage of the main armature A. However, the simultaneous deënergization of the auxiliary motor field winding 22 causes a corresponding increase in the speed of the motor-generator set, thereby tending to maintain a predetermined energization of the main field winding F.

It may be observed here that several of the systems hereinbefore described, those shown in Figs. 15 and 19, for example, are also adapted for regenerative operation. However, such operation is not material to my present invention, and is, moreover, fully set forth in my copending application, Serial No. 3766, filed August 7, 1914.

I do not wish to be restricted to the specific circuit connections or arrangement of parts herein set forth, as various modifications may be made within the spirit and scope of my invention. Moreover, I desire it to be understood that, in employing the expression "energize a predetermined part of the main field winding," or its equivalents, in the claims, I intend to signify any desired portion of the field winding, which may include the entire winding, in some instances. I also desire that only such limitations shall be imposed upon my invention as are indicated in the appended claims.

I claim as my invention:

1. In a control system, the combination with a supply circuit and a motor having an armature and a field-magnet winding, of a dynamo-electric machine having field windings and associated with the motor field windings for varying the energization of the latter to prevent flash-over conditions in the motor and means associated with the machine field windings for assisting in accelerating the motor.

2. In a control system, a supply circuit, an electric motor having an armature and a field-magnet winding connected across the supply circuit, and an auxiliary source of energy connected in series with said motor, of means energized by said auxiliary source of energy for energizing a predetermined part of said field winding upon a temporary interruption of energy from said supply circuit.

3. In a control system, the combination with a supply circuit and a motor having a field-magnet winding, of means comprising a dynamo-electric machine for maintaining a predetermined magnetic flux in the machine to prevent "flash-over" conditions upon a resumption of supply-circuit energy and means for automatically operating said dynamo-electric machine in accordance with the current flowing through said motor.

4. In a control system, a supply circuit, an electric motor having an armature and a field-magnet winding connected across the supply circuit and an auxiliary source of energy connected in series with said motor, of means energized by said auxiliary source of energy and governed by the current flowing through said motor for energizing a predetermined part of said winding upon a temporary interruption of energy from said supply circuit.

5. In a control system, the combination with a supply circuit, and an electric motor having an armature and a field magnet winding, of an auxiliary motor generator adapted to energize a predetermined part of said field winding and having a set of differentially-connected field magnet windings to effect an increased energization of said first field winding from said machine upon a temporary interruption of energy from said supply circuit.

6. In a control system, the combination with a supply circuit, and an electric motor having an armature and a field magnet winding, of an auxiliary motor-generator adapted to energize a predetermined part of said field winding and having differentially acting series-connected and shunt-connected field magnet windings to effect an increased speed of said motor-generator and a consequent increased energization of said first field winding therefrom upon a temporary interruption of energy from said supply circuit.

7. In a control system, the combination with a supply circuit, and an electric motor having an armature and a field magnet winding, of an auxiliary source of energy, and an auxiliary motor-generator connected thereto and adapted to energize a predetermined part of said field winding and having a plurality of field magnet windings respectively connected to said source of energy, in parallel with said armature and in series therewith, said last field magnet windings being arranged to act differentially to effect an increased energization of said first field winding therefrom under predetermined conditions.

8. In a control system, the combination with a supply circuit, and an electric motor having an armature and a field magnet winding, of a storage battery connected in circuit with said motor, and an auxiliary motor-generator connected thereto and adapted to energize a predetermined part of said field winding and having a plurality of field magnet windings respectively connected to said source of energy, in parallel with said armature, and in series therewith, said last field winding being wound differentially to the other two field windings of the motor-generator to effect an increased speed thereof and a consequent increased energization of the field winding of said motor therefrom upon a temporary interruption of energy from said supply circuit.

9. In a control system, the combination with a supply circuit, an electric motor having an armature and a field-magnet winding, of an auxiliary means for energizing a predetermined part of said field winding, and automatic means governed by the current flowing through said motor for varying said energization to prevent "flash-over" conditions in the motor.

10. In a control system, the combination with a supply circuit and a dynamo-electric machine having a field-magnet winding, of means comprising a dynamo-electric machine for energizing a predetermined part of said field winding upon a temporary interruption of the energy from said supply circuit.

11. In a control system, the combination with a supply circuit and an electric motor having an armature and a field-magnet winding, of means comprising a motor-generator set for energizing a predetermined part of said field winding upon a temporary interruption of the energy from the supply circuit.

12. In a control system, the combination with a supply circuit and an electric motor having an armature and a field-magnet winding, of means comprising a generator having differentially connected field magnet windings for effecting an increased energization of the motor in case the energy from said supply circuit be temporarily interrupted.

13. In a control system, the combination with a supply circuit and an electric motor having an armature and a field-magnet winding, of means comprising a motor-generator set having the generator armature thereof connected in shunt circuit to said motor field winding for effecting an increased energization of said motor field winding by said generator upon a temporary interruption of energy from said supply circuit.

In testimony whereof, I have hereunto subscribed my name this 22nd day of September, 1914.

RUDOLF E. HELLMUND.

Witnesses:
A. L. BROOMALL,
B. B. HINES.